US010386239B1

(12) United States Patent
Mitchell

(10) Patent No.: US 10,386,239 B1
(45) Date of Patent: *Aug. 20, 2019

(54) COMPACT HYPERSPECTRAL SYSTEMS

(71) Applicant: Wavefront Research, Inc., Bethlehem, PA (US)

(72) Inventor: Thomas A. Mitchell, Nazareth, PA (US)

(73) Assignee: Wavefront Research, Inc., Northampton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,814

(22) Filed: Jul. 16, 2018

Related U.S. Application Data

(63) Continuation of application No. 15/795,421, filed on Oct. 27, 2017, now Pat. No. 10,024,720.

(60) Provisional application No. 62/414,025, filed on Oct. 28, 2016.

(51) Int. Cl.
| | |
|---|---|
| *G01J 5/02* | (2006.01) |
| *G01J 5/08* | (2006.01) |
| *G01J 5/10* | (2006.01) |
| *G01J 3/02* | (2006.01) |
| *G02B 23/06* | (2006.01) |
| *G01J 5/04* | (2006.01) |

(52) U.S. Cl.
CPC ........... *G01J 5/0803* (2013.01); *G01J 3/0205* (2013.01); *G01J 5/041* (2013.01); *G01J 5/0806* (2013.01); *G01J 5/10* (2013.01); *G02B 23/06* (2013.01)

(58) Field of Classification Search
CPC ........ G01J 5/0803; G01J 5/041; G01J 5/0806; G01J 5/10; G02B 27/0905; G02B 2/10; G02B 27/14; G02B 27/144; G02B 27/149
USPC ....................................... 250/349
See application file for complete search history.

(56) References Cited

U.S. PATENT DOCUMENTS

| | | | | |
|---|---|---|---|---|
| 3,492,076 A | * | 1/1970 | Back | G01M 11/0292 356/124.5 |
| 9,568,737 B1 | * | 2/2017 | Mitchell | G02B 27/1006 |
| 2004/0227940 A1 | * | 11/2004 | Mitchell | G01J 3/18 356/328 |

* cited by examiner

*Primary Examiner* — David P Porta
*Assistant Examiner* — Meenakshi Sahu
(74) *Attorney, Agent, or Firm* — Burns & Levinson LLP; Orlando Lopez

(57) ABSTRACT

Hyperspectral imaging sensors that can readily switch between multiple common aperture imagers, and are more compact and lightweight than previous hyperspectral sensor designs.

21 Claims, 3 Drawing Sheets

COMPACT HYPERSPECTRAL SYSTEMS

CROSS REFERENCE TO RELATED APPLICATIONS

This application is a continuation of co-pending U.S. patent application Ser. No. 15/795,421, filed on Oct. 27, 2017, entitled COMPACT HYPERSPECTRAL SYSTEMS, which claims priority from U.S. Provisional Patent Application Ser. No. 62/414,025, filed Oct. 28, 2016, entitled COMPACT HYPERSPECTRAL SYSTEMS, both of which are incorporated herein by reference in their entirety for all purposes.

STATEMENT OF GOVERNMENT INTEREST

This invention was made with U.S. Government support from the U.S. Army under contract W15P7T-06-D-R401, subcontract R401-SC-20316-0252. The U.S. Government has certain rights in the invention.

BACKGROUND

The present teachings relate to hyperspectral imaging sensors and particularly to hyperspectral imaging sensors having two or more spectrometers that operate over different spectral bands that are capable of readily switching between multiple common aperture imagers, and are more compact and lightweight than previous hyperspectral sensor designs.

In some applications, spectral algorithms that process data from a combination of both spectral bands are used.

There is a need for hyperspectral imaging sensors that can readily switch between multiple common aperture imagers, and are more compact and lightweight than previous hyperspectral sensor designs.

SUMMARY

Hyperspectral imaging sensors that can readily switch between multiple common aperture imagers, and are more compact and lightweight than previous hyperspectral sensor designs are disclosed herein below.

For a better understanding of the present invention, together with other and further objects thereof, reference is made to the accompanying drawings and detailed description.

DETAILED DESCRIPTION

Figure 1:
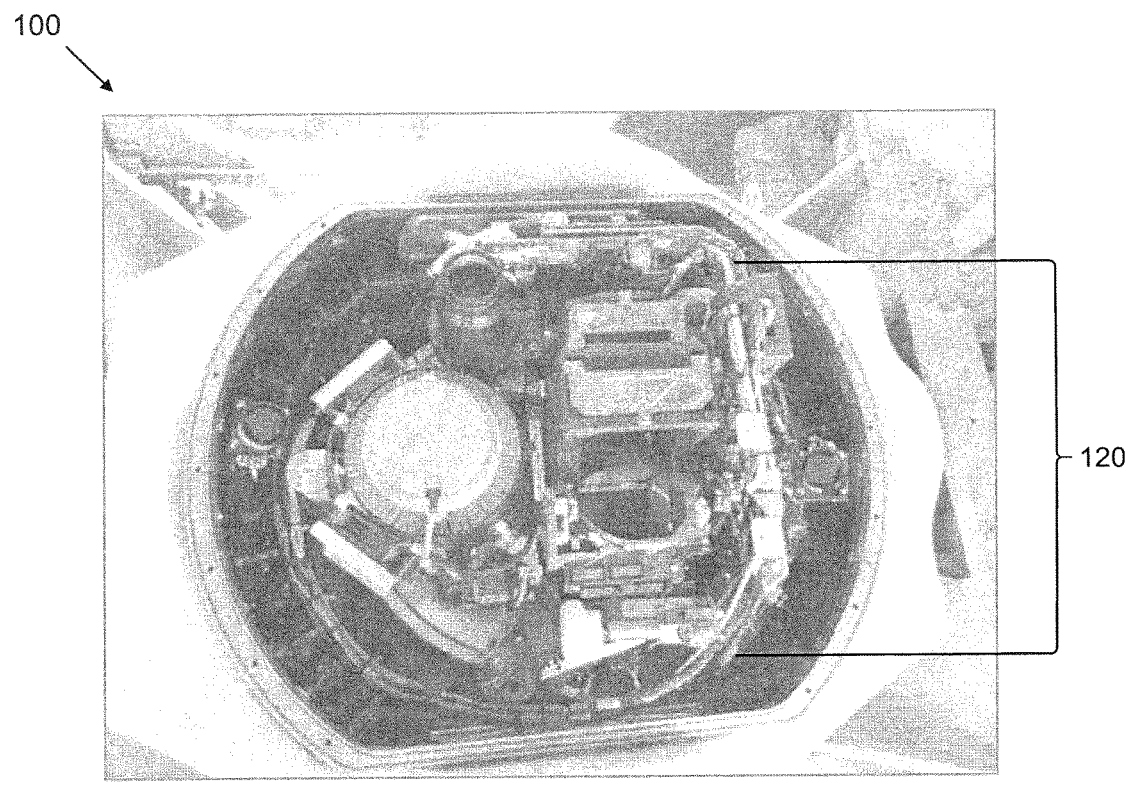
FIG. 1—The sensor installed in a gimbal.

Hyperspectral imaging sensors that can readily switch between multiple common aperture imagers, and are more compact and lightweight than previous hyperspectral sensor designs are disclosed herein below.

In one or more embodiments, the imaging optical system of these teachings includes a first optical system having at least one refractive or reflective element, the first optical system configured to substantially receive electromagnetic radiation emanating from a first source, the first optical system being configured to substantially collimate the electromagnetic radiation emanating from the first source, a second optical system having at least one refractive or reflective element, the second optical system configured to substantially receive electromagnetic radiation emanating from a second source, the second optical system being configured to substantially collimate the electromagnetic radiation emanating from the second source, a beam splitting device optically disposed to receive the electromagnetic radiation from the first and the second optical system, wherein the beam splitting device comprises a first beam splitter and a second beam splitter, the first and second beam splitters being configured to be movable such that one of the first and second beam splitters replaces another one of the first and second beam splitters in the optical path between the first and second optical systems in order to reconfigure the optical path, the first beam splitter being configured to substantially transmit a first portion of the electromagnetic radiation from the first optical system, the first beam splitter also being configured to substantially reflect a second portion of the electromagnetic radiation from the first optical system, the second beam splitter being configured to substantially reflect a first portion of the electromagnetic radiation from the second optical system, the second beam splitter also being configured to substantially transmit a second portion of the electromagnetic radiation from the second optical system, a third optical system having at least one refractive or reflective element, the third optical system being optically disposed to substantially receive the first portion of electromagnetic radiation from the first beam splitter when the first beam splitter is configured to be in the optical path and to receive the first portion of electromagnetic radiation from the second beam splitter when the second beam splitter is configured to be in the optical path, the third optical system being configured to substantially focus the first portion of the electromagnetic radiation to a first image plane, the first image plane being optically disposed to substantially receive the first portion of electromagnetic radiation, a fourth optical system having at least one refractive or reflective element, the fourth optical system being optically disposed to substantially receive the second portion of electromagnetic radiation from the first beam splitter when the first beam splitter is configured to be in the optical path and to receive the second portion of electromagnetic radiation from the second beam splitter when the second beam splitter is configured to be in the optical path, the fourth optical system being configured to substantially focus the second portion of electromagnetic radiation to a second image plane, the second image plane being optically disposed to substantially receive the second portion of electromagnetic radiation, a fifth optical system having at least one refractive or reflective element, the fifth optical system being a spectrometer, the fifth optical system being optically disposed to substantially receive a portion of the first portion of electromagnetic radiation from the third optical system, a first detecting element, the fifth optical system being configured to substantially disperse a portion of the first portion of electromagnetic radiation onto the first detecting element, the first detecting element being optically disposed to substantially receive the dispersed portion of the first portion of electromagnetic radiation, a sixth optical system having at least one refractive or reflective element, the sixth optical system being a spectrometer, the sixth optical system being optical disposed to substantially receive a portion of the second portion of electromagnetic radiation from the fourth optical system, a second detecting element, the sixth optical system being configured to substantially disperse a portion of the second portion of electromagnetic radiation onto the second detecting element, and the second detecting element being optically disposed to substantially receive the dispersed portion of the second portion of electromagnetic radiation.

In one instance, the first optical sub-system is a reflective telescope.

In another instance, the second optical sub-system is a common aperture optical relay.

In a yet another instance, the third optical sub-system is a telecentric reflective imager.

In a further instance, the fifth optical sub-system is a reflective relay spectrometer.

In still another instance, the sixth optical sub-system is a refractive relay spectrometer.

In other embodiments, the imaging optical system of these teachings also includes a Dewar, wherein the first and second detecting elements are both physically located within the Dewar.

The sensor design incorporates concepts of modularity, on-board calibration, and full-spectrum detection, all with a sensor smaller than a 16" cube. Dual focal plane arrays (FPAs) are used in a single integrated Dewar assembly incorporating a single cryo-cooler and cold finger which provides compactness and eliminates the need for pour-filling liquid nitrogen or helium. This compact design features a common afocal foreoptic with integrated scan mirror, and provides magnification adjustment and spatial alignments for inherently co-registered data throughout the combined VNIR/SWIR and LWIR spectra. The LWIR portion of the design is based on the LACHI Compact LWIR Hyperspectral Sensor developed by Wavefront Research (WRI), while the VNIR/SWIR portion is a reflective-based design extended from the refractive design format of the LACHI sensor.

Figure 2:
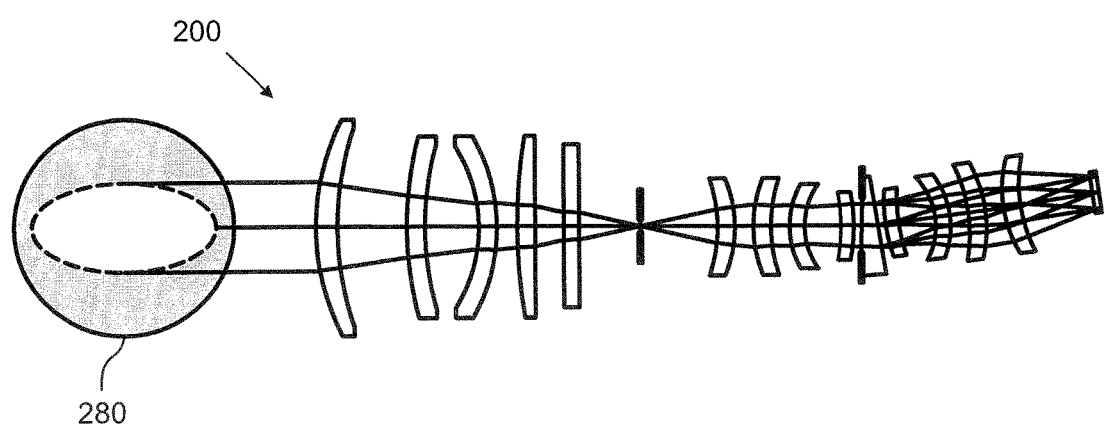
FIG. 2—Non-circular F/1.0 (spatial)×F/2.0 (spectral) optical speed spectrometer.
Figure 3:
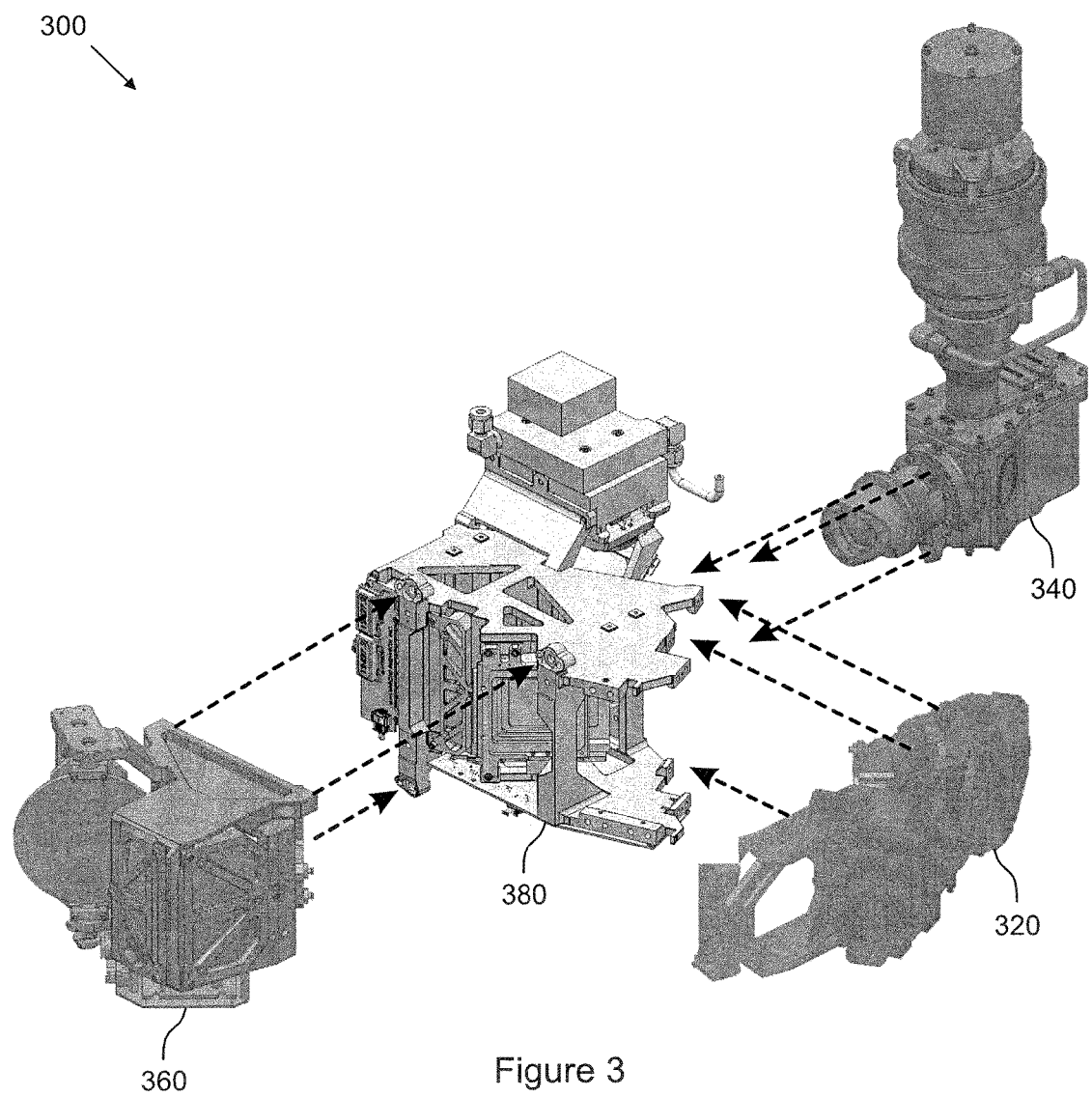
FIG. 3—The individual sub-system components of the sensor are shown.

The sensor system consists of a visible, near-infrared, short-wave infrared (VNIR/SWIR) hyperspectral imager, of the type described in the patent publication corresponding to the co-pending U.S. patent application Ser. No. 14/657,355, entitled REFLECTIVE RELAY SPECTROMETER, filed on Mar. 13, 2015, and co-pending U.S. patent application Ser. No. 14/839,302, entitled ELLIPTICAL APERTURE REFLECTIVE IMAGER, filed on Aug. 28, 2015, which are incorporated herein by reference in their entirety and for all purposes, and long-wave infrared (LWIR) hyperspectral imager, of the type described in the patent publication corresponding to the co-pending U.S. patent application Ser. No. 14/212,327, entitled COMPACT SPECTROMETER WITH HIGH SPECTRAL RESOLUTION, filed on Mar. 14, 2014, and co-pending U.S. Provisional Patent Application Ser. No. 62/213,155, entitled OPTICAL SYSTEMS WITH IMPROVED SIGNAL TO NOISE RATIO, filed on Nov. 29, 2016, which are incorporated herein by reference in their entirety and for all purposes, common afocal imager with integrated scan mirror, of the type described in U.S. Pat. No. 9,568,737, entitled COMPACT COMMON APERTURE IMAGER SYSTEM, and the patent publication corresponding to the co-pending U.S. patent application Ser. No. 15/166,729, entitled ELLIPTICAL APERTURE REFLECTIVE IMAGER, filed on May 27, 2016, which are incorporated herein by reference in their entirety and for all purposes, and an internal calibration unit, of the type described in U.S. Pat. No. 9,791,705, entitled COMMON APERTURE OPTICAL RELAY SYSTEM, which is incorporated herein by reference in its entirety and for all purposes, that was designed to be housed in a gimbal. FIG. 1 shows the sensor 120 integrated into a gimbal 100. The system uses a dual, compact spectrometer core design 200 from Wavefront Research, Inc. (WRI) with an F/1.0 (spatial)×F/2.0 (spectral) optical speed (FIG. 2) and integral diffraction shield 280. Referring to FIG. 3, this design uses a common aperture and beam splitter for focusing energy onto two imaging spectrometers 320 and 340, providing simultaneous and co-registered imaging, of the type described in the patent publication corresponding to the co-pending U.S. patent application Ser. No. 15/784,510, entitled ENHANCED CO-REGISTERED OPTICAL SYSTEMS, filed on Oct. 16, 2017, which is incorporated herein by reference in its entirety and for all purposes, in reflective and emissive bands, with average resolution of 10.6 nm and 25 nm respectively. This common aperture provides for the use of an interchangeable fore-optic 360 for multiple fields of view (FOV). This core uses an all-reflective spectrometer optical design in the VNIR/SWIR, and an all-refractive spectrometer optical design in the LWIR. The Dewar/cooler assembly uses a unique single cold finger design, of the type described in the patent application corresponding to co-pending U.S. patent application Ser. No. 14/604,139, entitled COMPACT DUAL DETECTOR DEWAR, filed on Jan. 23, 2015, which is incorporated herein by reference in its entirety and for all purposes, to which both detectors are affixed. Using mounting structures with specifically designed thermal conductances, the FPAs are maintained at appropriate cryogenic temperatures. The LWIR FPA is cooled to 50K while the thermally isolated VNIR/SWIR FPA is cooled to approximately 120K.

Figure 4:
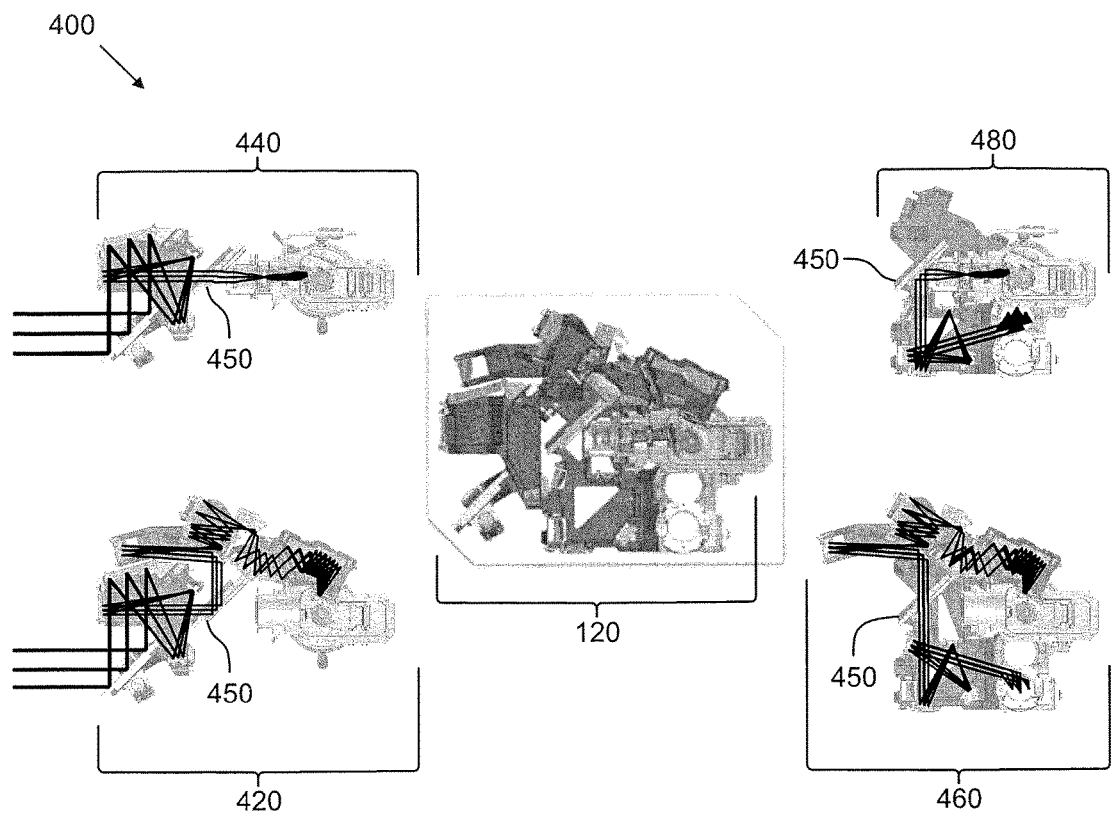
FIG. 4—The individual sub-system components of the sensor are shown.
Figure 5:
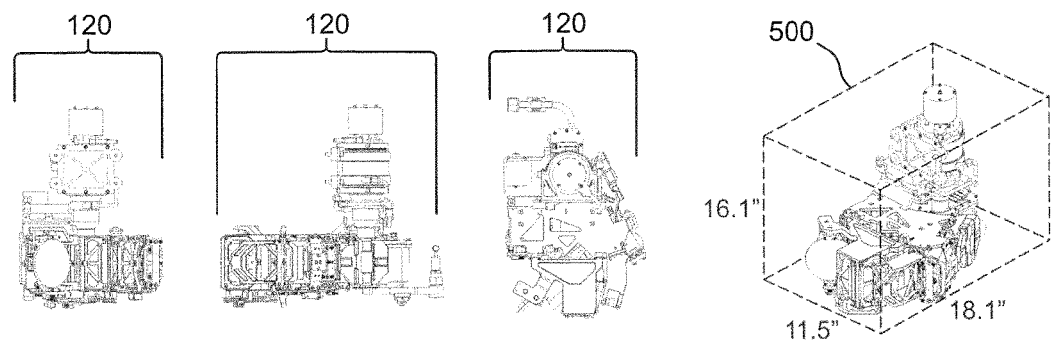
FIG. 5—VNIR/SWIR and LWIR full spectrum imaging spectrometer in a compact form factor.

Referring to FIG. 4, the system 120 contains a dual-function beamsplitter assembly 450, of the type described in the patent application corresponding to the co-pending U.S. patent application Ser. No. 14/213,155, entitled COMMON APERTURE OPTICAL SYSTEM AND SELECTIVE IMAGING METHOD, filed on Mar. 14, 2014, which is incorporated herein by reference in its entirety and for all purposes, that allows the sensor to switch between imaging and calibration modes. In its imaging mode, scene imagery is directed to the VNIR/SWIR and LWIR spectrometers through a common aperture module, as shown in mode configurations 420 and 440 respectively. This module contains a motor-driven scan mirror as well as an all-reflective 4× afocal reflective optical assembly. The spectrometer images a single spatial line, and the scanner provides the second axis of coverage in order to capture a two-dimensional FOV. The 4× afocal imager converts the native 25 mm focal length of the individual spectrometers to the overall system level focal length of 100 mm. In its calibration mode, calibration imagery is directed to the VNIR-SWIR and LWIR spectrometers from an internal calibration module, as shown in mode configurations 460 and 480 respectively. This calibration module enables an in-situ absolute reference for calibration of the sensor data. The module provides VNIR/SWIR calibration source via a specifically designed Spectralon-coated cavity illuminated by a quartz-tungsten-halogen source in a light-tight housing with a shutter. LWIR calibration is accomplished through the use of a compact blackbody source. The VNIR/SWIR and LWIR calibration sources are combined into a common aperture calibration source module that provides radiometric calibration imagery to both sensors simultaneously. The individual sub-system components of the sensor are shown in FIG. 3, while the imaging and calibration modes of operation for both the VNIR-SWIR and LWIR sensor portions of the sensor are illustrated in FIG. 4. By combining both optical paths into a single fore-optic and Dewar with a single cryo-cooler, the sensor head 120 can fit within a 16" cube 500 and be integrated into a 26" gimbal (FIG. 5). The sensor also contains an integrated electronics module that provides operation of the calibration and beamsplitter components as well as health and status monitoring of the sensor, including various temperatures within the sensor. This sensor design provides a unique spectral imaging capability. With the availability of co-registered reflective and emissive hyperspectral data, further development and refinement of full-spectrum detection algorithms is possible. Additional detection capabilities and new mission possibilities are available to users with the smaller, lighter, and well performing sensor system.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although specific features of the disclosure are shown in some drawings and not in others, this is for convenience only as each feature may be combined with any or all of the other features in accordance with the disclosure. Other examples will occur to those skilled in the art and are within the claims.

The invention claimed is:

1. An imaging optical system comprising:
a first optical system having at least one refractive or reflective element; said first optical system configured to substantially receive electromagnetic radiation emanating from a source; said first optical system being configured to substantially collimate the electromagnetic radiation emanating from said source;
a beam splitting device optically disposed to receive the electromagnetic radiation from said first optical system; said beam splitting device being configured to substantially direct a first portion of the electromagnetic radiation from said first optical system in a first direction; said beam splitting device also being configured to substantially direct a second portion of the electromagnetic radiation from said first optical system in a second direction;
a second optical system having at least one refractive or reflective element; said second optical system being optically disposed to substantially receive said first portion of electromagnetic radiation from said beam splitting device; said second optical system being configured to substantially focus said first portion of the electromagnetic radiation to a first image plane; said first image plane being optically disposed to substantially receive said first portion of electromagnetic radiation;
a third optical system having at least one refractive or reflective element; said third optical system being optically disposed to substantially receive said second portion of electromagnetic radiation from said beam splitting device; said third optical system being configured to substantially focus said second portion of electromagnetic radiation to a second image plane; said second image plane being optically disposed to substantially receive said second portion of electromagnetic radiation;
a fourth optical system having at least one refractive or reflective element; said fourth optical system being a spectrometer; said fourth optical system being optically disposed to substantially receive a portion of said first portion of electromagnetic radiation from said second optical system;
a first detecting element; said fourth optical system being configured to substantially disperse a portion of said first portion of electromagnetic radiation onto said first detecting element; said first detecting element being optically disposed to substantially receive said dispersed portion of said first portion of electromagnetic radiation;
a fifth optical system having at least one refractive or reflective element; said fifth optical system being a spectrometer; said fifth optical system being optically disposed to substantially receive a portion of said second portion of electromagnetic radiation from said third optical system; and
a second detecting element; said fifth optical system being configured to substantially disperse a portion of said second portion of electromagnetic radiation onto said second detecting element; and said second detecting element being optically disposed to substantially receive said dispersed portion of said second portion of electromagnetic radiation.

2. The imaging optical system of claim 1 wherein said first optical system is a reflective telescope.

3. The imaging optical system of claim 1 wherein said second optical system is a telecentric reflective imager.

4. The imaging optical system of claim 1 wherein said third optical system is a telecentric refractive imager.

5. The imaging optical system of claim 1 wherein said fourth optical system is a reflective relay spectrometer.

6. The imaging optical system of claim 1 wherein said fifth optical system is a refractive relay spectrometer.

7. The imaging optical system of claim 1 further comprising:
a Dewar, wherein said first and second detecting elements are both physically located within said Dewar.

8. An imaging optical system comprising:
a beam splitting device optically disposed to receive electromagnetic radiation emanating from a source; said beam splitting device being configured to substantially direct a first portion of the electromagnetic radiation from said source in a first direction; said beam splitting device also being configured to substantially direct a second portion of the electromagnetic radiation from said source in a second direction;
a first optical system having at least one refractive or reflective element; said first optical system being optically disposed to substantially receive said first portion of the electromagnetic radiation from said beam splitting device; said first optical system being configured to substantially focus said first portion of the electromagnetic radiation to a first image plane; said first image plane being optically disposed to substantially receive said first portion of electromagnetic radiation;
a second optical system having at least one refractive or reflective element; said second optical system being optically disposed to substantially receive said second portion of electromagnetic radiation from said beam splitting device; said second optical system being configured to substantially focus said second portion of electromagnetic radiation to a second image plane; said second image plane being optically disposed to substantially receive said second portion of electromagnetic radiation;

a third optical system having at least one refractive or reflective element; said third optical system being a spectrometer; said third optical system being optically disposed to substantially receive a portion of said first portion of electromagnetic radiation from said first optical system;

a first detecting element; said third optical system being configured to substantially disperse a portion of said first portion of electromagnetic radiation onto said first detecting element; said first detecting element being optically disposed to substantially receive said dispersed portion of said first portion of electromagnetic radiation;

a fourth optical system having at least one refractive or reflective element; said fourth optical system being a spectrometer; said fourth optical system being optically disposed to substantially receive a portion of said second portion of electromagnetic radiation from said second optical system; and a second detecting element; said fourth optical system being configured to substantially disperse a portion of said second portion of electromagnetic radiation onto said second detecting element; and said second detecting element being optically disposed to substantially receive said dispersed portion of said second portion of electromagnetic radiation.

9. The imaging optical system of claim 8 wherein said first optical system is a telecentric reflective imager.

10. The imaging optical system of claim 8 wherein said second optical system is a telecentric refractive imager.

11. The imaging optical system of claim 8 wherein said third optical system is a reflective relay spectrometer.

12. The imaging optical system of claim 8 wherein said fourth optical system is a refractive relay spectrometer.

13. The imaging optical system of claim 8 further comprising:
a Dewar, wherein said first and second detecting elements are both physically located within said Dewar.

14. An imaging optical system comprising:
a beam splitting device optically disposed to receive electromagnetic radiation emanating from a source; said beam splitting device being configured to substantially direct a first portion of the electromagnetic radiation from said source in a first direction; said beam splitting device also being configured to substantially direct a second portion of the electromagnetic radiation from said source in a second direction;

a first optical system having at least one refractive or reflective element; said first optical system being a spectrometer; said first optical system being optically disposed to substantially receive said first portion of electromagnetic radiation from said beam splitting device;

a first detecting element; said first optical system being configured to substantially disperse a portion of said first portion of electromagnetic radiation onto said first detecting element; said first detecting element being optically disposed to substantially receive said dispersed portion of said first portion of electromagnetic radiation;

a second optical system having at least one refractive or reflective element; said second optical system being a spectrometer; said second optical system being optically disposed to substantially receive said second portion of electromagnetic radiation from said beam splitting device; and a second detecting element; said second optical system being configured to substantially disperse a portion of said second portion of electromagnetic radiation onto said second detecting element; and said second detecting element being optically disposed to substantially receive said dispersed portion of said second portion of electromagnetic radiation.

15. The imaging optical system of claim 14 wherein said first optical system is a reflective relay spectrometer.

16. The imaging optical system of claim 14 wherein said second optical system is a refractive relay spectrometer.

17. The imaging optical system of claim 14 further comprising:
a Dewar, wherein said first and second detecting elements are both physically located within said Dewar.

18. An imaging optical system comprising:
a beam splitting device optically disposed to receive electromagnetic radiation emanating from a source; said beam splitting device being configured to substantially transmit a first portion of the electromagnetic radiation from said source; said beam splitting device also being configured to substantially reflect a second portion of the electromagnetic radiation from said source;

a first optical system having at least one refractive or reflective element; said first optical system being a spectrometer; said first optical system being optically disposed to substantially receive said first portion of electromagnetic radiation from said beam splitting device;

a first detecting element; said first optical system being configured to substantially disperse a portion of said first portion of electromagnetic radiation onto said first detecting element; said first detecting element being optically disposed to substantially receive said dispersed portion of said first portion of electromagnetic radiation;

a second optical system having at least one refractive or reflective element; said second optical system being a spectrometer; said second optical system being optically disposed to substantially receive said second portion of electromagnetic radiation from said beam splitting device; and a second detecting element; said second optical system being configured to substantially disperse a portion of said second portion of electromagnetic radiation onto said second detecting element; and said second detecting element being optically disposed to substantially receive said dispersed portion of said second portion of electromagnetic radiation.

19. The imaging optical system of claim 18 wherein said first optical system is a reflective relay spectrometer.

20. The imaging optical system of claim 18 wherein said second optical system is a refractive relay spectrometer.

21. The imaging optical system of claim 18 further comprising:
a Dewar, wherein said first and second detecting elements are both physically located within said Dewar.

* * * * *